Patented June 12, 1951

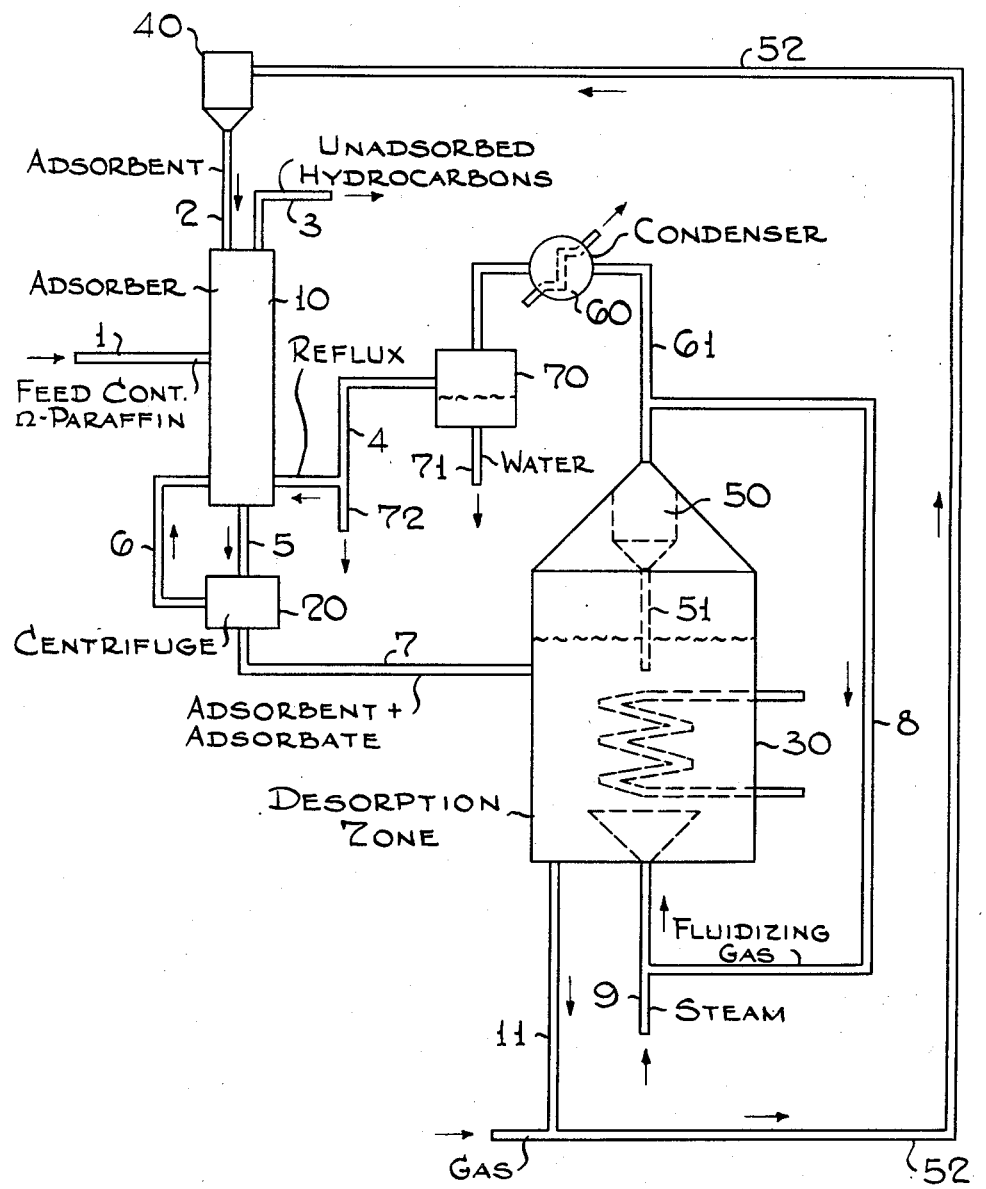

2,556,859

UNITED STATES PATENT OFFICE 2,556,859

PROCESS OF FURTHER ACTIVATING ACTIVATED CARBON

Hans G. Vesterdal, Elizabeth, N. J., assignor to Standard Oil Development Company, a corporation of Delaware Application June 23, 1949, Serial No. 100,882

3 Claims. (Cl. 252—421)

The present invention is concerned with a process for the preparation of carbon which has a high selectivity for the separation of one type of molecular constituent from other types. By preparing the carbon in accordance with the present invention, an activated carbon having a greatly improved selectivity for straight chain hydrocarbons as compared to, for example, branched chain hydrocarbons, is obtained. In accordance with the present invention, a selective carbon of this type is produced by heating an activated carbon in an inert atmosphere at an elevated temperature for a selected time period.

It is well known in the art to prepare activated carbons by various procedures. These carbons are secured from various sources such as peat, sawdust, bituminous coal, petroleum coke, nut shells, and the like. However, the activity of the respective carbons varies appreciably depending upon the sources from which they are derived and upon the activation procedure. A very desirable carbon is one which is secured, for instance, from cocoanut charcoal. This is produced by carbonizing the cocoanut shells at about 700° F. to 1200° F., preferably in vacuum or in the presence of steam, followed by steam activation of the char at about 1200° F. to 1600° F. Activated carbons may also be made from peat or sawdust or from mixtures of the two by reaction with potassium sulfide at about 1600 to 1700° F. followed by steam activation at about 900 to 1300° F.

In all these operations, the carbon produced is activated by heating in the presence of steam at elevated temperatures which have generally been in the range below about 1500° F. It has now been discovered, however, that if the activated carbon is given an additional treatment by heating in an inert atmosphere at a temperature above 1800° F., preferably at a temperature in the range from about 2000° F. to 2500° F., unexpected and desirable results will be secured with respect to the ability of the carbon to selectively adsorb one type of molecular constituent from others. While this process may be employed in the preparation of active carbons derived from any source, it is particularly effective in producing excellent selective carbons derived from bituminous coal.

The activated carbon of the present invention is prepared by coking the carbonaceous material, for example, cocoanut shells or bituminous coal, at about 700° F. to 1200° F. in a vacuum or in the presence of steam or an inert gas. The resulting char is activated by steaming at about 1200 to 1600° F., preferably in a fluid type reactor. The carbon is then heated to a temperature in the range from 1800° F. to 2700° F. in the presence of an inert gas such as nitrogen, helium, argon, methane, and the like. It is preferred that the temperature be in the range from about 2000° F. to 2500° F. The inert gas, for example, nitrogen, which is employed must be substantially completely free of oxygen. It is very essential that the oxygen concentration be less than about .1% by volume, and preferably, be less than .05%. It is desirable that the carbon be held at this temperature for a period of at least two hours, preferably for a period of from about 3 to 4 hours.

As pointed out heretofore, by preparing the carbon in accordance with the present invention, the activated carbon product will have a greater selectivity for one type of molecular constituent as compared to other types. The activated carbon product, however, is particularly adapted for the segregation of various types of hydrocarbon constituents such as the separation of n-paraffins from iso-paraffins. A particular adaptation of the present invention is to prepare an activated carbon as described and to utilize the activated carbon for the extraction of n-paraffins from virgin naphthas. In this type of operation, a virgin naphtha cut, as for example, one boiling in the range from about 140° F. to 215° F. is treated with the activated carbon. The n-paraffins are adsorbed preferentially on the carbon. The carbon is removed and the n-paraffins recovered by desorption, preferably by treatment with steam. The n-paraffins may also be recovered by treating the carbon with other hydrocarbons boiling in a different boiling range. The n-paraffins thus recovered are relatively pure. It is also within the scope of the present invention to employ the highly selective carbon to separate mixtures of gases, for example, ethylene and propane, coke-oven gas containing hydrogen sulfide, and the like.

The activated carbon product prepared as described may be used in a treatment of hydrocarbons either in the liquid or gaseous phase. If the vapor phase operation be conducted, it is preferred that the temperatures not exceed about 350° F. Pressures may be as high as 50 to 100 pounds per square inch. Desorption of the adsorbed product is preferably carried out by subjecting the carbon containing the adsorbed products to a temperature in the range from about 500 to 700° F. If a liquid phase operation be utilized, the temperatures may be as high as 150° F. The pressures likewise may vary appreciably.

It is within the scope of the present invention to employ the activated carbon in the fluidized state. Under these conditions, the diameter size of the carbon particles is in the range from about 20 to 120 microns and higher. The velocity of the upflowing gases is in the range from about .5 to 15 feet per second.

The present invention may be more fully understood by reference to the drawing illustrating one embodiment of the same. For the purpose of illustration, a slurry type operation is disclosed wherein n-paraffins are separated from liquid mixtures containing the same. Referring specifically to the drawing, a feed stream containing n-paraffins is introduced at an intermediate point into adsorption zone 10 by means of feed line 1. The activated carbon prepared in accordance with the present invention from a bituminous coal is introduced into the top of zone 10 by means of line 2. The upflowing feed stream countercurrently contacts the downflowing carbon in the upper area of zone 10. Unadsorbed hydrocarbons are withdrawn from the top of zone 10 by means of line 3. The carbon containing the adsorbed constituents thereon flows downwardly in zone 10 and contacts reflux introduced into zone 10 by means of line 4. The carbon withdrawn from the bottom of zone 10 by means of line 5 is preferably centrifuged in zone 20 to remove a supernatant liquid which is returned to zone 10 by means of line 6.

The carbon containing the desired adsorbed constituents is removed from centrifuge zone 20 by means of line 7 and introduced into a recovery zone 30. For the purpose of illustration, it is assumed that the desorber 30 comprises a fluid unit which is maintained at a temperature of about 500° F. Operating conditions in zone 30 are adjusted to maintain the carbon in the fluid state. This is secured by introducing a fluidizing gas into the bottom of zone 30 by means of line 8 and steam by means of line 9.

The carbon free of adsorbed constituents is withdrawn from the bottom of zone 30 by means of line 11 and preferably recycled to the top of zone 10. Prior to introducing the desorbed carbon into the top of zone 10, the carbon is passed through a cyclone unit 40 or equivalent means in order to separate therefrom the transporting gas.

The adsorbed constituents separated in zone 30 are removed through cyclone 50 maintained in the top of zone 30. Entrained carbonaceous material is separated from the product gases in zone 50 and returned to the fluid bed by means of line 51. Fluidizing gas is recycled to the bottom of zone 30 by means of line 8 while the remainder of the vapors removed overhead from zone 30 are passed into condensing zone 60 by means of line 61. The vapors are condensed in zone 60, withdrawn by means of line 62 and introduced into accumulator 70. A separation between the aqueous phase and the hydrocarbon phase occurs in zone 70. The aqueous phase is withdrawn from zone 70 by means of line 71, while the hydrocarbon phase is withdrawn by means of line 4. A portion of this phase constituting the product is withdrawn from line 4 by means of line 72 and further handled or refined, as desired. The remainder is recycled to zone 10 as reflux.

The invention may be more fully understood by the following examples illustrating embodiments of the same.

EXAMPLE 1

A mixture comprising 50% of n-heptane and 50% of isooctane was treated at 70° F. with activated carbon secured from bituminous coal. The coal was carbonized by heating at a temperature in the range from 700 to 1200° F. The resulting char was activated by steam at a temperature in the range from 1200° F. to 1600° F. One portion (A) of this activated carbon was not further treated. Another portion (B) was treated in a nitrogen atmosphere containing less than .1% of oxygen by volume at a temperature of about 500° F. A third portion (C) was similarly treated except that the temperature employed was 1500° F. A fourth portion (D) was similarly treated at a temperature of about 1800° F. A fifth portion (E) was treated in a similar manner except that the temperature employed was about 2400° F. The separation factor[1] of the respective carbons was as follows:

| Carbon | Temperature of Activation in inert atmosphere | Separation Factor |
|---|---|---|
| | ° F. | |
| A | 0 | 1.42 |
| B | 500 | 1.43 |
| C | 1,500 | 1.48 |
| D | 1,800 | 1.70 |
| E | 2,400 | 2.02 |

$y_1$ = volume per cent of least adsorbed component in unadsorbed phase.
$y_2$ = volume per cent of most adsorbed component in unadsorbed phase.
$x_1$ = volume per cent of least adsorbed component in adsorbed phase.
$x_2$ = volume per cent of most adsorbed component in adsorbed phase.

It is evident from the above that a sharp break occurs in activating the carbon in accordance with the present invention at a temperature of about 1800° F.

EXAMPLE 2

Portions of active carbon secured from bituminous coal prepared as described in Example 1, were treated with commercial nitrogen which contained about 0.2% oxygen. The results of these operations are as follows:

*Effect of heating time at 1600° F.*

| Heat Treating Time, Hours | 0 | 3 | 9 | 27 |
|---|---|---|---|---|
| Heat Treating Loss, Wt. Per Cent | 0 | 9.0 | 12.6 | 43.7 |
| N. Heptane/Isooctane (50/50) Adsorption: | | | | |
| Capacity, cc./100 g | 68 | 75 | 82 | 89 |
| Separation Factor | 1.46 | 1.51 | 1.29 | 1.30 |

As shown above, the adsorptive capacity increased with increasing time of heating in nitrogen containing a small amount of oxygen. The separation factor of n. heptane/isooctane mixtures, on the other hand, decreased.

EXAMPLE 3

The following table illustrates the effect of heating a 20-65 mesh activated carbon from bituminous coal, produced by carbonization at 700 to 1200° F. followed by steam activation at about 1500° F., at temperatures from 1600 to 2400° F. in nitrogen (O₂-free) for 3 to 4 hours. The adsorptive properties of the carbon were determined by adsorption of a 50/50 n. hep-

[1] Separation factor = $\frac{(y_1)(x_2)}{(y_2)(x_1)}$ tane/isooctane mixture on the carbon and determination of the composition of the adsorbed and of the unadsorbed liquid.

| | Carbon | | | |
|---|---|---|---|---|
| Heat Treating Temperature, °F | 1,850 | 2,100 | 2,400 | No Treatment |
| Heat Treating Loss, wt. percent | 11.2 | 15.0 | 14.7 | -------- |
| Adsorptive Capacity, cc./100 g. carbon | 78 | 77 | 73 | 68 |
| Separation Factor | 1.45 | 1.70 | 1.82 | 1.46 |

It is apparent that there is a sharp increase in separation factor, on raising the temperature from 1850° to 2100° F. and a further increase on raising the heat treating temperature further to 2400° F. While the invention is not to be restricted thereby, it is believed that the increase in selectivity may be due to shrinking of the pores by the heat treatment so that the carbon approaches the nature of a molecular sieve, like chabazite.

EXAMPLE 4

The steam-activated bituminous coal produced as shown in Example 1, was extracted with dilute aqueous HCl (17% HCl) in order to remove the ash before the heat treatment. The ash content was reduced from 5.7 to 1.6%. The extracted carbon had a capacity of 79 cc./100 g. and a selectivity (separation factor) of 1.40 for separation of 50/50 n-heptane/isooctane mixtures. This carbon was then heated in nitrogen for four hours at 2400° F. Due to the heat treatment, the capacity dropped somewhat, to 60 cc./100 g. but the selectivity increased from 1.40 to 2.03.

EXAMPLE 5

An activated carbon was made from cocoanut shells according to the activation procedure shown in Example 1. A 28 x 80 mesh cut of this carbon was then heated for three hours in nitrogen at 2400° F. By this heat treatment the capacity decreased from 53 to 42 cc./100 g. but the selectivity increased from 2.08 to 2.48.

EXAMPLE 6

Another batch of cocoanut shells was carbonized and steam-activated according to the procedure shown in Example 1. An 8 x 14 mesh cut of this carbon was heated four hours in nitrogen at 2400° F. The capacity dropped from 71 cc./100 g. to 48 cc./100 g. due to the heat treatment, but the selectivity increased from 1.42 to 1.77.

The present invention is broadly concerned with the preparation of a carbon having a higher selectivity. The carbon of the present invention may be used in the fluidized state. The carbon also may be used to treat either gases or liquids. The invention is more specifically concerned with the preparation of a highly active carbon secured from bituminous coal. In accordance with this preferred concept of the invention, bituminous coal is coked at a temperature in the range from about 700° F. to 1200° F. in a vacuum or in the presence of steam. The resulting char is then activated by steaming at a temperature in the range from 1200 to 1600° F. This activated char is then further heat treated in an inert atmosphere (less than about .1% oxygen by volume) at a temperature in the range from 1800° F. to 2700° F. It is preferred that the temperature be in the range from 2000 to 2500° F.

The activated carbon prepared in accordance with the present invention may be used to separate one type of hydrocarbon constituent from another. These carbons are particularly adapted for the segregation of n-paraffins from iso-paraffins, and the like. It is, however, to be understood that the carbons prepared in accordance with the present invention may be used in other adsorptive processes such as in the separation of oxygen and sulfur-containing compounds from water or oil, aromatics from other hydrocarbons, or straight chain alcohols from branched chain alcohols, and the like.

Having described the invention, it is claimed:

1. Process for the preparation of an activated carbon adaptable for the adsorptive separation of normal paraffin hydrocarbons from iso-paraffin hydrocarbons which comprises, coking carbonaceous material at a temperature of 700–1200° F. to produce a carbon, activating said carbon by treatment with steam at a temperature of 1200–1600° F. and thereafter further activating said activated carbon by heating the same in an inert atmosphere substantially completely free of oxygen at a temperature of 1800–2700° F. for a period of at least two hours.

2. Process according to claim 1 in which the carbonaceous material is bituminous coal and in which the final activation in an inert atmosphere is carried out at a temperature in the range of 2000–2500° F.

3. Process according to claim 1 in which the final heating at temperatures of 1800–2700° F. is carried out for a period of three to four hours.

HANS G. VESTERDAL.

REFERENCES CITED

The following references are of record in the file of this patent:

UNITED STATES PATENTS

| Number | Name | Date |
|---|---|---|
| 1,774,341 | Von Halban et al. | Aug. 26, 1930 |
| 1,780,154 | Gardner | Nov. 4, 1930 |